United States Patent
Andersson et al.

(10) Patent No.: US 7,881,966 B2
(45) Date of Patent: Feb. 1, 2011

(54) METHOD OF TRACKING IN PRODUCTION IN A PLANT FOR LIQUID FOODS

(75) Inventors: Axel Andersson, Malmö (SE); Pontus Luedtke, Löddeköpinge (SE); Peter Bjernetun, Lomma (SE); Anders Fridh, Veberöd (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 1296 days.

(21) Appl. No.: 10/705,936

(22) Filed: Nov. 13, 2003

(65) Prior Publication Data

US 2004/0098158 A1    May 20, 2004

(51) Int. Cl.
    *G06Q 20/00* (2006.01)
(52) U.S. Cl. .............. 705/23; 705/22; 705/28
(58) Field of Classification Search ............ 705/23, 705/22, 28
    See application file for complete search history.

(56) References Cited

U.S. PATENT DOCUMENTS

| | | | |
|---|---|---|---|
| 5,478,990 A * | 12/1995 | Montanari et al. ......... 235/375 |
| 6,104,966 A * | 8/2000 | Haagensen ................ 700/116 |
| 6,231,435 B1 * | 5/2001 | Pilger ....................... 452/157 |
| 6,671,698 B2 * | 12/2003 | Pickett et al. ............. 707/104.1 |
| 6,705,523 B1 * | 3/2004 | Stamm et al. .............. 235/385 |
| 6,874,000 B2 * | 3/2005 | Sholl et al. ............... 707/104.1 |
| 6,901,304 B2 * | 5/2005 | Swan et al. ............... 700/115 |
| 7,062,262 B2 * | 6/2006 | Baird ....................... 455/419 |
| 7,085,777 B2 * | 8/2006 | Beck et al. .............. 707/104.1 |

* cited by examiner

*Primary Examiner*—Ramsey Refai
(74) *Attorney, Agent, or Firm*—Buchanan Ingersoll & Rooney PC

(57) ABSTRACT

The invention relates to a method and associated database structure for tracking in production in a plant for liquid foods. Each production unit in the plant is allocated a unit identity which is registered in a database. Each production unit can be a source or a destination. Each material quantity which is included in the production is allocated a work identity which is registered in the database. A material quantity includes a given product of a given quantity. Each event in the plant is registered in the database. The registration takes place as a transport from a source to a destination, with references to the unit identities of both the source and the destination.

5 Claims, 4 Drawing Sheets

Track Report

Printed: 2002-04-14
Work ID: 1871232222

Material Input to T01

| WorkID | Source | Between | | Material | Actual | StartedBy |
|---|---|---|---|---|---|---|
| 561 234 567 | R01 | 2002-03-25 06:21:0 | 6:42:00 | Raw milk | 19 765,00 | Barry |
| 561 234 568 | R01 | 2002-03-25 07:32:0 | 7:59:00 | Raw milk | 22 156,00 | Barry |

Material Output from T01

| WorkID | Dest | Between | | Material | Actual | StartedBy |
|---|---|---|---|---|---|---|
| 112 314 433 | P1 | 2002-03-25 09:30:0 | 10:12:00 | Raw milk | 19 802,00 | Barry |
| 394 399 912 | P2 | 2002-03-25 10:14:0 | 11:02:00 | Past. milk | 21 102,00 | Barry |

Fig. 2

METHOD OF TRACKING IN PRODUCTION IN A PLANT FOR LIQUID FOODS

RELATED APPLICATIONS

The application claims priority under 35 U.S.C. §§119 to Swedish Application SE 0203368-6 filed in Sweden on Nov. 14, 2002, the entire contents of which are hereby incorporated by reference.

TECHNICAL FIELD

The present invention relates to a method of tracking in production in a plant for liquid foods.

BACKGROUND ART

In all types of plants which produce foods, there is a need for some form of tracking in production so that it is possible, from the finished product, to obtain information as to the raw materials which were included and from whence these raw materials came. In some cases, legislation is already in place or will soon be in place requiring such tracking capabilities.

In a number of food production plants, such as within the meat industry, there have long existed sophisticated systems making for such tracking in a simple manner. For example, meat may be marked with food-approved stamps which can be read-off both manually and by machine.

As regards plants for liquid foods, such as dairies and juice factories, it has not proved as easy to establish a system of tracking. One method which has been in place for some time is the method of employing time and date stamps. Each transport in, for example, a dairy is allocated a time and date stamp, a start and stop time, when the transport took place. By comparing different time and date stamps, it is possible to create a tree structure which provides for tracking. A drawback in this system is that the method cannot be employed if a transport, for some reason, is delayed. Since delays occur more or less generally in most plants, this method is not entirely reliable.

A more recent method is the so-called batch identification method, where all units which are included in a process are allocated an identification which readily makes for tracking. This method is extensively used within the pharmaceuticals industry. A drawback is that the units which are reserved for a batch cannot be employed for anything else during the time when the batch is processed. Much greater flexibility is desirable within the dairy industry. For example, it is not uncommon to need to fill a tank, which then constitutes one batch, at the same time as the same is to be emptied, which then constitutes another batch.

SUMMARY OF THE INVENTION

A method for attaining tracking in a plant for liquid foods is desired.

The method can be processed simply in a database and that, with the aid of this database, it is possible rapidly and reliably to obtain information which tracks the raw materials in a dairy, in a juice factory or in the production of still drinks.

An exemplary method of the type described by way of introduction includes a feature whereby each production unit in the plant is allocated a unit identity which is registered and which may either constitute a source and/or a destination. Each material quantity in the production is allocated a work identity which is registered. Each event in the plant is registered with a work identity partly as a transport from a source with reference to the unit identity of the source, and/or partly to a destination with reference to the unit identity of the destination.

According to exemplary embodiments, a database structure is provided for tracking production of flowable liquid to be packaged into containers within a plant. An exemplary database structure includes a method of tracking in production in a plant for liquid foods, comprising allocating each production unit in the plant a unit identity which is registered and which constitutes a source and/or a destination; allocating each material quantity in the production a work identity which is registered; and registering in a table each event in the plant with a work identity to identify a transport partly from a source with reference to the unit identity of the source and/or partly to a destination with reference to the unit identity of the destination.

According to exemplary embodiments, the database structure is stored in a computer readable medium; the material quantity work identity represents an identified quantity of a certain flowable liquid; and the production unit is at least one of a liquid transport line and a holding tank used for batch processing prior to filling product containers.

In alternate embodiments, the database structure is configured such that at least one material quantity work identity in the database structure represents a first liquid for human consumption, and at least one additional material quantity work identity in the database structure represents a second liquid used to wash a production unit involved in transport of the first liquid.

BRIEF DESCRIPTION OF THE ACCOMPANYING DRAWINGS

Exemplary embodiments and methods according to the present invention will now be described in greater detail hereinbelow, with reference to the accompanying Drawings. In the accompanying Drawings:

FIG. 2 shows a tracking report;

DESCRIPTION OF PREFERRED EMBODIMENT

An exemplary method for tracking in production is disclosed which is particularly applicable to plants for liquid foods such as dairies, juice factories or in the production of so-called still drinks. In a dairy or a juice factory, there is an amount of processing equipment which is interconnected via conduits. Each individual section of the processing equipment is designated a production unit 1. A production unit 1 can, for example, be or include a tank, a pasteurizer, a filling machine or the like. A production unit 1 may also be or include a road tanker, an intake line or a filling line.

Figure 1:
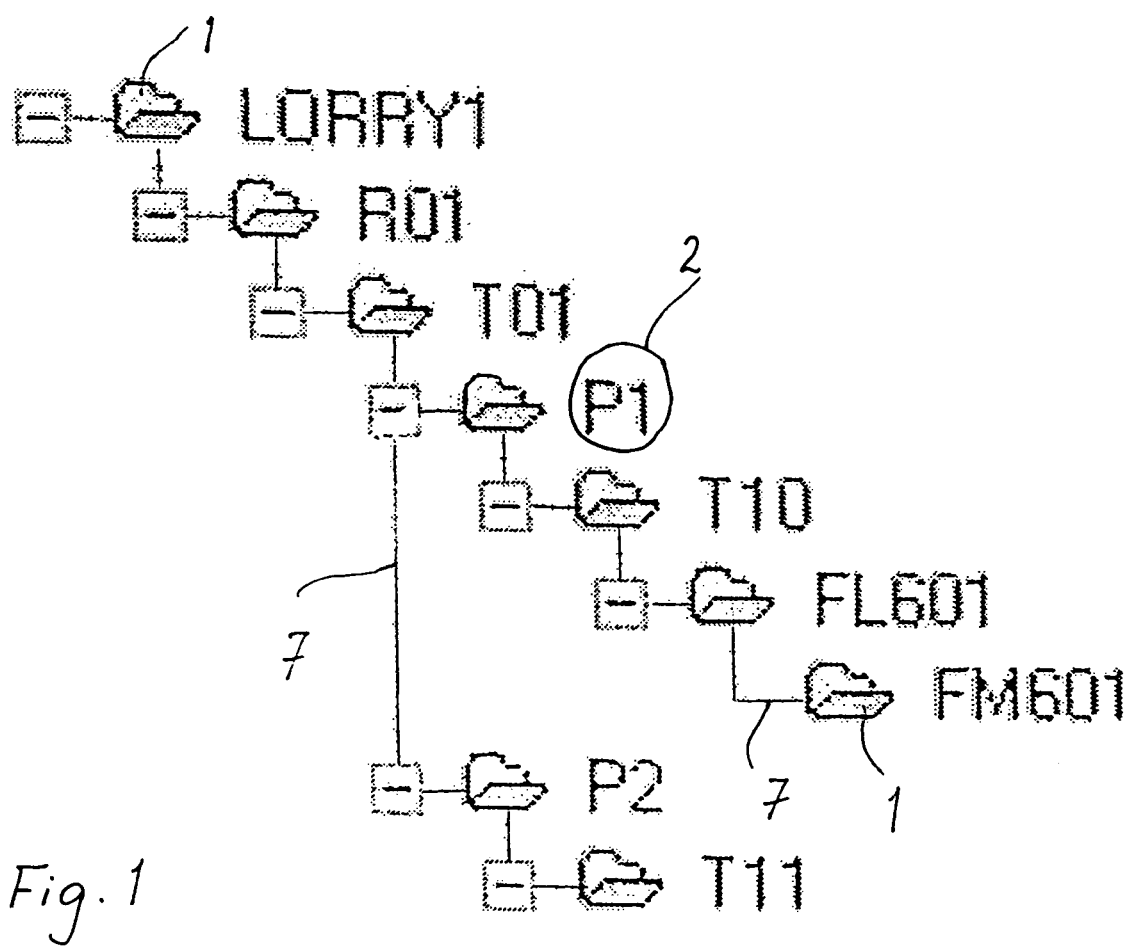
FIG. 1 shows a first "tree structure", displaying events.
Figure 3:
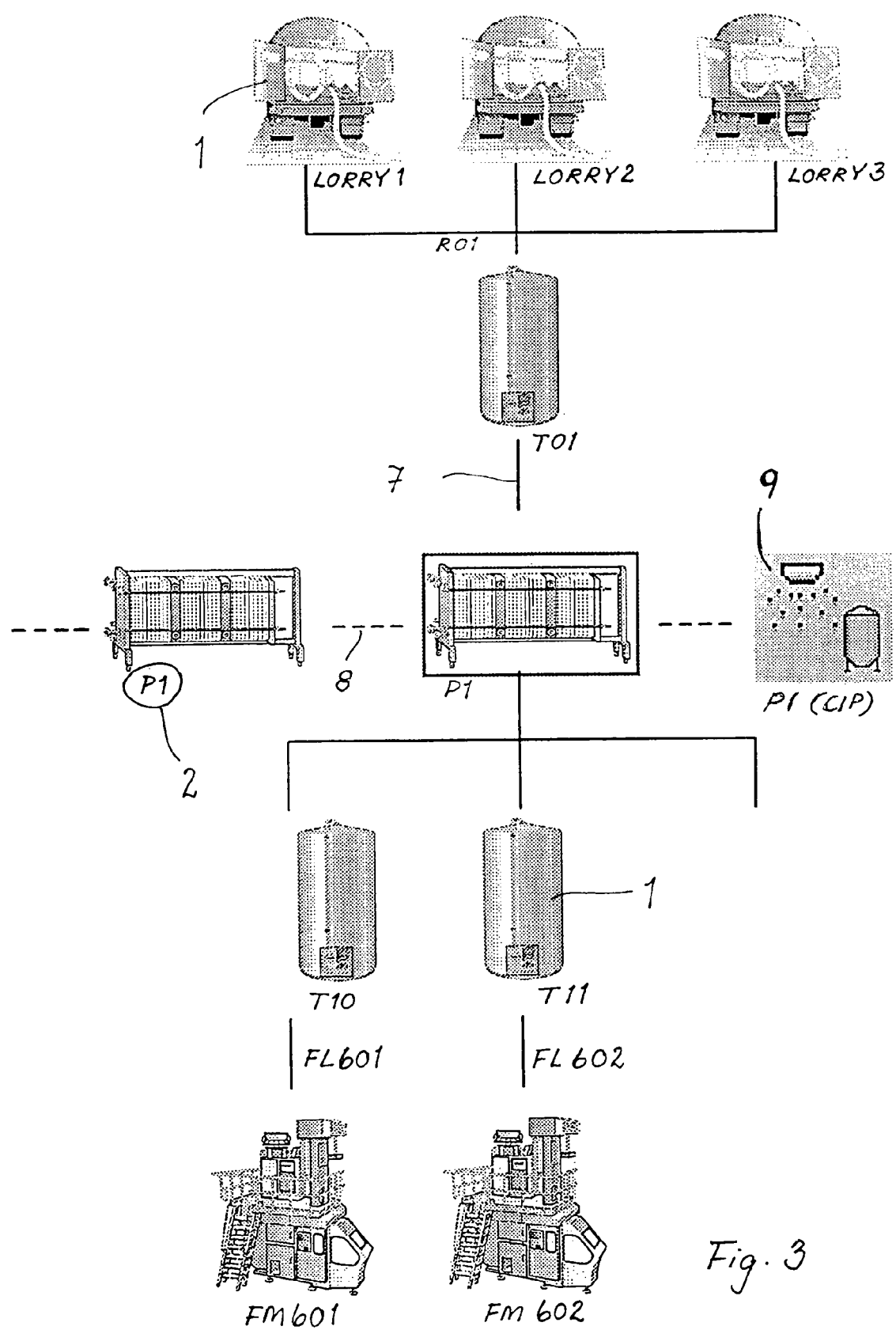
FIG. 3 shows a second "tree structure" displaying events.

Each production unit 1 is allocated a unit identity 2 which is registered in a database. The identity can, for example, be allocated at plant start up. The unit identity 2 can be disclosed by means of figures or by letters, or by a combination of both. FIGS. 1 and 3 show different unit identities 2 such as LORRY 1 which is a road tanker, T01 and T10 which are tanks, and so on. These unit identities 2 are more or less permanent for a plant but vary from one dairy or juice factory to another, depending on what equipment is in place in the plant.

During production in a plant for liquid foods, product or material is handled in different volumes. By identifying these as material quantities 3, they can be allocated a work identity 4 which is registered in the database. A material quantity 3 is defined by a certain product 5, such as raw milk, pasteurized milk and so on, and by a certain volume or quantity 6 which is indicated in liters or kilos. The work identity 4 may also be given in figures or letters or as a combination of both. The number of characters depends on how long the intention is to run the plant before the unique work identity 4 is to be reused. FIG. 2 shows material quantity work identities 4 indicated under the column WorkID.

When a product is produced in a plant for liquid foods, in principle the different material volumes or quantities 3 are transported. The transport may encompass an entire material volume or quantity 3 or a part thereof. This may be defined as a number of events 7 which may also be described as constituting transports between the different production units 1. An event 7 has a source and a destination, where the source and the destination can be different production units. The events 7 are registered in a table of the database and can be allocated a unique event identity. The events 7 are registered with references to the material quantity work identity 4 and with respect to the unit identities of the source and/or of the destination. An event identity 7 can be indicated by figures or letters or as a combination of both.

Before anything happens in the plant, the material 5 which is to be transported is allocated a material quantity work identity 4. An event identity is also allocated. For example, the driver of a road tanker arriving at the dairy may not be permitted to empty his road tanker before the contents of the road tanker have been allocated a work identity 4 and the emptying procedure which constitutes an event has been allocated its identity number. There can be clear and unambiguous rules as to how and when work identities 4 are to be allocated. However, these rules may vary from one dairy to another. Examples of such rules are that the contents of a tank must be emptied or the tank be washed before a new material quantity work identity 4 can be allocated. For example, a pasteurizer can have material quantity work identities 4 indicated at production start-up per product 5.

With an exemplary method, it is a simple matter to create unit identities 2 and work identities 4 which can be communicated with the outside world. It is then possible to track from whence the contents in a specific production unit 1 derive. The event sequence in a plant can be given in a "tree structure" such as that shown in FIG. 1 or FIG. 3.

In FIG. 1, each production unit 1 is illustrated by a file on each occasion when the production unit 1 is employed in production. The production unit 1 can be both a source and a destination, depending on how the material quantities associated with each work identity 4 have been transported. The transports, i.e. the events 7, are shown in FIG. 1 as thin lines between two files.

The example in FIG. 1 shows a "tree structure" where a road tanker LORRY 1 enters a dairy. The road tanker LORRY 1 empties its tank, the contents consisting of raw milk, via a reception line R01 to a tank T01. From the tank T01 which contains a certain quantity of raw milk, a part of this quantity of raw milk is conducted further to a pasteurizer P1. After the pasteurizer, the material, which now consists of pasteurized milk, is fed to a tank T10. The remaining part of the material quantity in the tank T01 is conveyed to another pasteurizer P2 and from this further to a tank T11.

The material quantity which is in the tank T10 and which consists of pasteurized milk of a certain quantity is transported according to FIG. 1 further to a filling line FL601 and to a filling machine FM601 where the pasteurized milk is packed in consumer packages.

All material quantities 3 having work identities 4 which are handled in the plant, and all events 7 with their identities are registered in a specifically adapted database. For each event 7, a source and destination are indicated with their respective unit identities 2 and with references to the material quantity work identity 4 of the source and the destination, respectively. This data can be presented in the form of a "tree structure" as shown in FIG. 1 and FIG. 3, or in a Track Report as shown in FIG. 2.

The Track Report of FIG. 2 is designed as an answer to a question, or query. In the example, the tank T01 has been taken as the point of departure. The report is divided in two and the first part provides information about from whence the contents of the tank T01 derive. In the second part, information is provided as to where this content was subsequently transported. In the first part, the tank T01 has been designated the destination, and in the second part it has been designated the source.

In each respective part of the report, there are columns for WorkID, (i.e. the material quantity work identity 4) and for the source and destination (i.e., indicated using unit identities 2). There may also be provided columns in the report for the time interval during which the transport/event 7 was carried out or occurred, which product 5 was transported and in what quantity 6, as well as who initiated the event 7.

FIG. 3 is a so-called "tree structure" which shows advantages of an exemplary method according to the invention. In FIG. 3, a time axis 8 is illustrated by a broken line. In FIG. 3, an exemplary display of events associated with a pasteurizer P1 is shown. FIG. 3 represents the sources and destinations of material processed by the pasteurizer P1 at a central point in time along the time axis 8. The processing which occurs within P1 at different points in time can be accessed by moving to the right or to the left along the time axis 8. Movement to the right hand side of FIG. 3 along axis 8 depicts a processing condition at a point in time subsequent to the point in time illustrated. If the FIG. 3 tree structure was presented on a user interface, the user could click on the cleaning in place (CIP) pasteurizer icon 9 shown to the right hand side of axis 8 and view the source and destination information associated with pasteurizer P1 at that point in time. However, there would typically be no source or destination information for a CIP process.

Alternately, the user could click on the pasteurizer P1 icon shown to the left hand side of axis 8 in FIG. 3 and view the tree structure associated with the pasteurizer P1 at this earlier point in time. The tree structure can thus display the sources and destinations of material quantities processed by the pasteurizer P1 for different points in time. The FIG. 3 display can, for example, be accessible via a general user interface.

The FIG. 3 tree structure is a helpful visualization because it is common in a dairy to use the same production unit, such as pasteurizer P1, for a number of different products, such as the raw milk product 5 of FIG. 2, without intervening cleaning of the pasteurizer. Using an exemplary method of the present invention, it is possible to track a certain material in different parts of the "tree structure". For example, material quantities which pass through the pasteurizer P1 are given different material quantity work identities 4 depending on the product 5 (e.g., raw milk) and the quantity 6 of each product 5.

By indicating cleaning of the pasteurizer 9 with a separate material quantity work identity 4 (WorkID) it is easy to reliably determine where the material quantity work identities 4 of different products 5 have points of contact with one another and where they do not. A material quantity work identity 4 which constitutes the CIP (Cleaning in Place), typically has no source and no destination.

With the aid of these methods of presenting the product flow and the event sequence in a plant for liquid foods, it is possible, in a rapid and reliable manner, to track the contents of a product at any point whatever in the plant, both from whence the product comes and to where it has been transported.

As will have been apparent from the foregoing disclosure, the present invention can provide a method for tracking within a dairy, juice or other factory which does not possess the problems and limitations of prior art methods.

The present invention is also directed to a database structure for tracking production of flowable liquid to be packaged into containers within a plant. An exemplary database structure includes a production unit identity for each production unit to be monitored with respect to the flowable material, wherein each production unit can constitute a source and/or a destination of the flowable liquid. A material quantity work identity can be allocated for each quantity of the flowable liquid, wherein a separate material quantity work identity is registered to a partial quantity of the flowable liquid. An event identity can be used for registering the production unit which serves as a partial source and/or destination of the flowable liquid to a material quantity work identity representing the partial quantity of the flowable liquid transported by the production unit.

According to exemplary embodiments, the database structure is stored in a computer readable medium. The material quantity work identity is associated with an identified quantity of a certain flowable liquid. The production unit can be at least one of a liquid transport line and a holding tank used for batch processing prior to filling product containers.

In an exemplary embodiment, the database structure is configured such that at least one material quantity identity in the database structure represents a first liquid for human consumption, and at least one additional material quantity work identity in the database structure represents a second liquid used to wash a production unit involved in transport of the first liquid.

An exemplary "Table Report" for such a database structure is included in an attached "Attachment A", which is incorporated as part of the present specification.

In the exemplary database structure, each of the entries designated by "Column Details" corresponds to an exemplary table that can be included, and maintained with up-to-date information regarding the tracking of materials through a production process. For example, a first table labelled "AccessData" includes six designated columns. A separate row can be created for each new entry in the table. Those skilled in the art will appreciate that a database structure as shown can maintain a correlation of materials, in full and/or partial quantities, to track their processing within a plant using material, production unit and work identifiers, and associated timestamp information. Any or all information entered into the database during operation can be supplied manually (e.g., user input) or can be supplied automatically using sensors (e.g., flow and/or weight meters) to track an amount of liquid supplied to/from a given production unit at any given time.

A user can access the database structure to obtain any desired information contained therein. For example, a user can input a work identifier of a given product identity (e.g., of a processed product), and obtain all information from the database structure which pertains to the processing of that product. The information can be presented in a format such as that shown in any or all of FIGS. 1-3.

The tables in the database structure are by way of example only, and numerous variations and/or adaptions to any given process will be readily apparent to those skilled in the art.

In the exemplary structure, a product can be tracked as it is processed throughout a plant.

Tracking, or tracing, of material as it is processed, or after it has been processed in a plant, can be performed using the "WorkID" associated with a unit of a material, and three tables of a relational database described by reference to Attachment A; namely: the WorkLog table; the WorkEventLog table; and the TransferLog table. In the exemplary database, the designation "WorkID" includes attributes which correspond to material quantity work identifiers and production unit identifiers.

Generally speaking, the WorkLog table maintains information with respect to each production unit and with respect to each quantity of material to be processed. The WorkEventLog table maintains current and historical information with respect to the phase execution of material within a given production unit. The TransferLog table maintains information associated with the transfer of material between two production units and, in an exemplary embodiment, all such logging occurs upon completion of phase execution. Because an interrelationship (cross-referencing) is maintained among these three tables, the processing of any material in the plant can be traced, and the details associated with the quantity of material can be readily obtained. The inter-relationships of these three tables, and their use in tracing a product being processed, will now be described.

The WorkLog table contains information that is general to each WorkID. For example, where the WorkID corresponds to a unit of material, this table contains information such as the material and material quantity. Where the WorkID corresponds to a particular production unit identity, the table contains parameters associated with the given production unit.

A product can be received via a transport, such as a road tanker that is used to fill a receiving tank (e.g., tank T01) via reception line (e.g., R01) in the plant. Each of the road tanker and the tank are allocated a WorkID in the WorkLog table. The reception line is also allocated a WorkID in the WorkLog table. The operation used to fill the receiving tank is an event 7 referred to herein as a transfer event. The transfer event connects a material and two production units, such as the road tanker LORRY 1 and a reception line (e.g., R01) associated with the receiving tank. The transfer event is allocated a row in the TransferLog table. Those skilled in the art will appreciate that a transfer can be a connection between any two production units. For example, the transfer event can be associated with a transfer between a connection of the reception line and the receiving tank, or between the receiving tank and some other downstream production unit. Details regarding each of the production units involved in the transfer can be assessed in the WorkLog table using the WorkID. That is, each transfer event is associated, or tagged, with a WorkID of the material, with the source unit WorkID of the production unit from which material was obtained (or fetched), and with the destination unit WorkID of the production to which the material was delivered.

In operation, when an event 7, such as a transfer event is started, it is logged to the WorkEventLog table (see page 19 of "Attachment A") in the database. The WorkEventLog table contains current and historical information regarding phase execution of material in a given production unit. For example, this table contains information regarding a WorkLogID (which serves as an identifier for the processing event), the unit WorkID of the destination production unit associated with the processing information regarding the start time and end time of the event, and other identifying information desired with respect to the event (e.g., an indication that a phase of processing was either done or aborted).

The TransferLog table contains information on the transportation of material between different production units, such as material type, actual quantity of material transferred, material name, engineering units of material transferred, and so forth. Logging occurs at, for example, phase completion (that is, when the transfer is either done or aborted). Referring to page 16 of Attachment A, an exemplary TransferLog table is shown to store information regarding the name of the material which has been moved (e.g., milk), the quantity of the material moved, and a cross reference to the WorkEventLog table through, for example, storage of the WorkEventLogID.

As the receiving tank is being filled in this example, the receiving tank changes status from an empty condition to a filled condition. As the tank is being filled, the level in the tank becomes greater than zero, and this can be registered in the WorkLog table by inserting a new row into the table for the production unit involved. The WorkLog table can store information regarding the material being supplied to the receiving tank, and a timestamp of the starting time associated with the filling event. When the tank is full, it will contain a single material, although the volume of that material can vary, depending if there is a continuous filling/emptying operation occurring.

The unique work ID assigned to the material itself is stored in the WorkLog table. Material which continuously passes through the tank, until the tank becomes empty, can be attributed to the same WorkID. When a tank becomes empty, the WorkID can be "closed" and the receiving tank can be prepared for the receipt of a new material that will have a new WorkID. When the WorkID is "closed", the WorkLog Table can be updated to include an ending timestamp associated with the closing of that WorkID.

In contrast to known systems, exemplary embodiments of the present invention can attribute a WorkID to a material quantity which has passed through a particular production unit. As such, the flow of that material quantity, or any portion thereof, can be traced throughout its movement through the production plant. A tracing of the material can be performed from a particular point in the plant backwards through the plant. A forward trace can also be performed to track the movement of material through the plant to its ultimate disposition.

The trace of a material quantity in either direction through the plant, can be performed using the WorkLog table, the WorkEventLog table, and the TransferLog table. These tables contain information to allow for the tracing of a material quantity.

To trace backwards, a WorkID for a particular material of interest can be used to search the WorkEventLog table to identify processing events which involved that material. For a trace backwards, a destination production unit column in the WorkEventLog table can be searched for the WorkID of a material of interest. Upon determining a destination production unit associated with the WorkID of this material, an associated source production unit which supplied the material to the identified destination production unit can be identified. The WorkID of the source production unit involved can be used to address the WorkLog table (i.e., the source production unit's WorkID can be used to address the WorkLog table). The WorkLog table will provide information regarding the material of interest; namely, the amount of material, and timestamps associated with the processing of the material in the source production unit. This search process can be repeated for all occurrences of the WorkID of the material. Details regarding each transfer of the material can be obtained from the TransferLog tables.

This operation can be repeated working backwards through the plant until the entire movement of the material within the plant has been determined. Those skilled in the art will appreciate that it is possible to have multiple events (i.e., multiple rows) in the WorkEventLog table for a particular destination production unit. This is because multiple transfers to the same destination production unit can be performed at the same time (e.g., as when different materials are being mixed together).

To perform a forward tracking of material through the production plant, the WorkID of a material of interest can be used to search a column in the WorkEventLog table associated with source production unit WorkIDs. Once a source production unit has been identified, an associated destination production unit can be identified, and used to access the WorkLog table to identify characteristics of the material of interest. The TransferLog table can be accessed to identify details regarding each transfer of the material.

Figure 4:
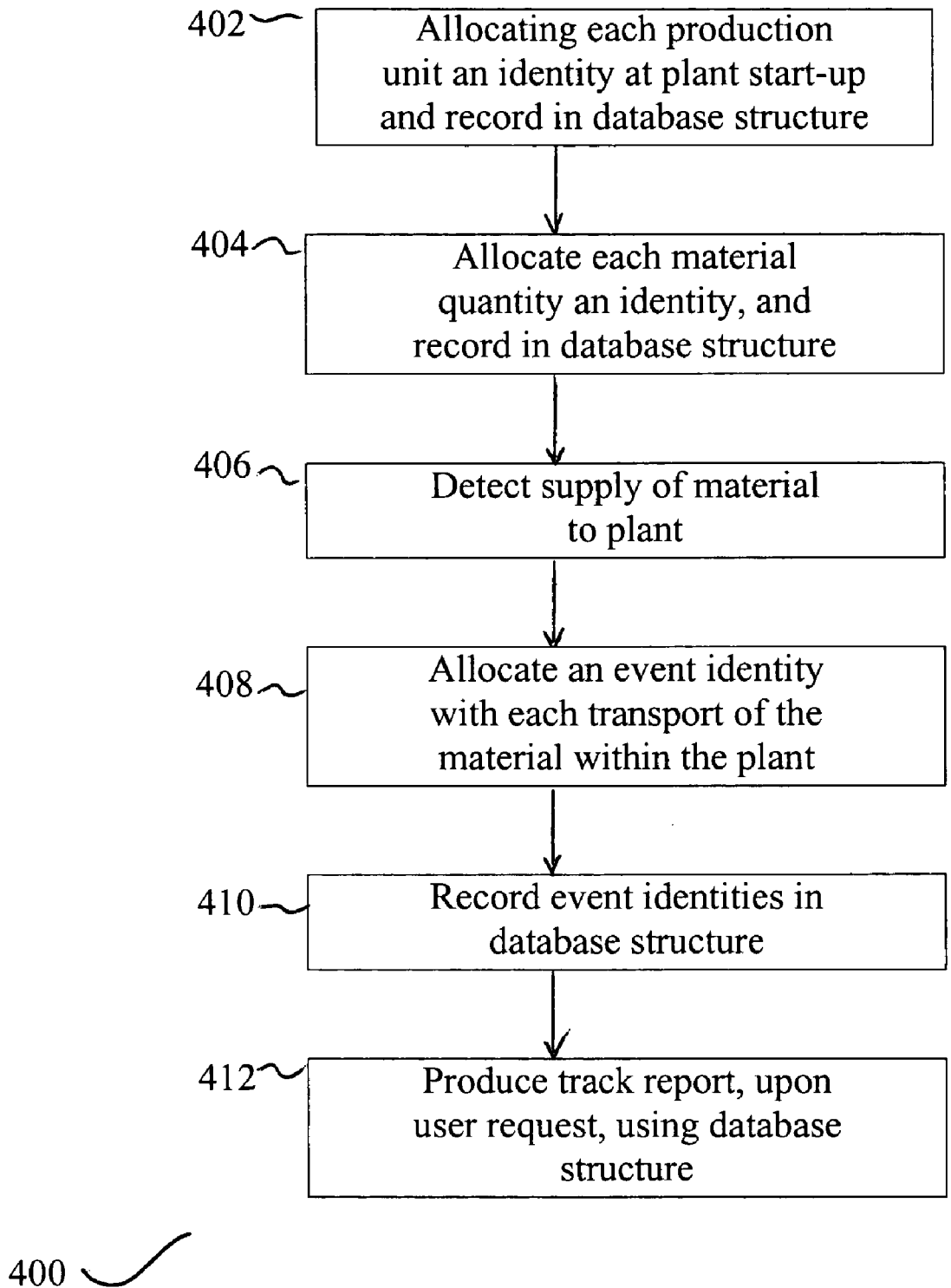
FIG. 4 is a flow chart of a computer program which can be used to create and access a database structure configured in accordance with an exemplary embodiment of the present invention.

FIG. 4 illustrates an exemplary flow chart of a computer program which can be used to create and access the database structure. In the FIG. 4 flow chart 400, a first step 402 involves allocating each production unit an identity (e.g., a WorkID), and recording the identity in the database structure (e.g., the WorkLog table). The identity can, for example, be allocated at plant start up using an automated discovery process whereby a computer detects the addition of a production unit to the overall plant and incrementally assigns an identity to each added production unit.

In step 404, each material quantity to be processed within the plant can be allocated an identity (e.g., a WorkID), and this identity can be recorded in the database structure (e.g., in the WorkLog table). Material quantities which can be processed in the plant can, for example, be input by a user through manual input.

In step 406, materials being transferred to the plant are detected. In step 408, a transfer event identity is allocated to each transport of the material within the plant in a manner as already discussed. In step 410, the transfer event identities are recorded in the database structure (e.g., in the WorkLog table). For example, with each supply or distribution of a material quantity to or from a production unit, a transfer event identity can be incremented and assigned to the event for recordation in the database structure with, for example, a timestamp. Whenever material is processed and/or transferred within the plant, the WorkEventLog table is updated with details and upon completion of a transfer, the TransferLog table is updated with a cross reference to the associated entry in the WorkEventLog table.

In step 412, a user can request the output of a track report similar to that already described. For example, a user can supply a material identity or product identity, via a graphical user interface. A computer accessed using the graphical user interface can then produce a track report similar to that already discussed by accessing the database structure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of tracking materials in a plant that produces liquid foods, the method being executed by a computer having a database that stores data associated with production units in the plant, and comprises the steps of:

allocating, in the database, a unit identity to each production unit, the unit identity is registered and identifies the production unit as one of a source and a destination of material during production of the liquid food in the plant;

receiving, in the computer, a material quantity of each material in the production of the liquid food;

allocating, a first work identity to a material quantity of a respective material in the production of the liquid food, wherein the first work identity of a material quantity changes based on a registered event;

registering the first work identity, in the database;

registering, in the database, events in the plant with the first work identity of the material quantity of the material, wherein the event identifies a transport of at least a portion of the material quantity from a source production unit in the plant with reference to the unit identity allocated to the source production unit in the plant and/or to a destination production unit in the plant with reference to the unit identity allocated to the destination production unit in the plant; and displaying data associated with at least one event of a specific point in time based on the unit identity of a production unit and the first work identity of the material quantity.

2. The method as claimed in claim 1, wherein the material quantity is determined by a certain material, by a certain volume of a material and/or a quantity of a material.

3. The method as claimed in claim 1, wherein the unit identity and first work identity include a number of figures, letters and/or a combination of figures and letters.

4. The method as claimed in claim 1, wherein the registered events and a material flow in the plant are illustrated in a user interface using a tree structure.

5. The method as claimed in claim 4, wherein a second work identity of a material quantity includes washing of at least one of the production units, said second work identity of a material quantity having no source and no destination.

* * * * *